June 27, 1961 E. E. HOOD 2,989,879
ACTUATOR FOR TWO-SPEED BICYCLE GEARING
Filed Nov. 19, 1958
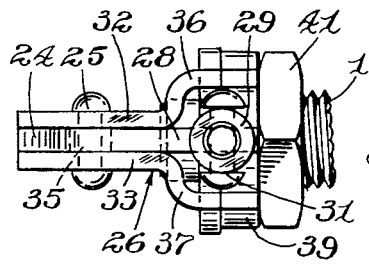
Fig.3
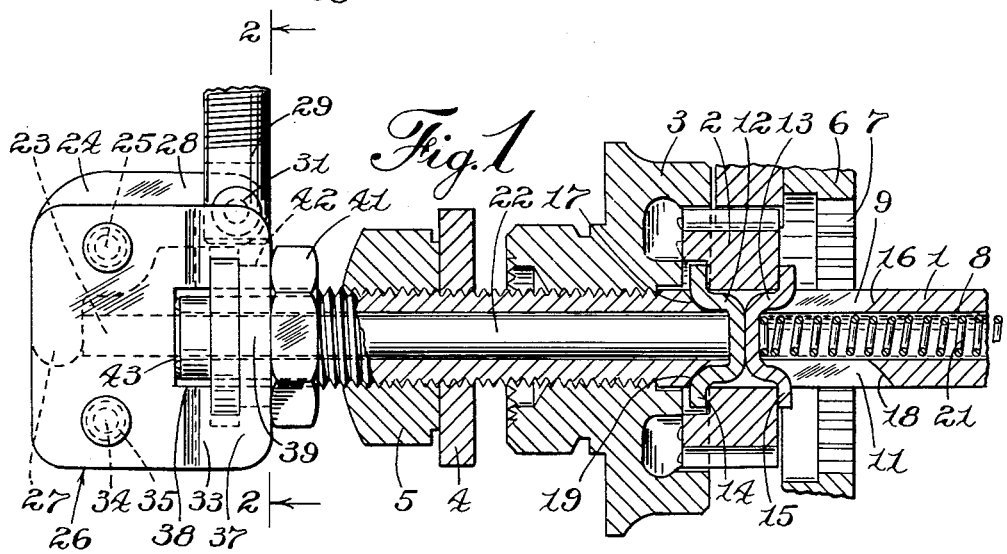
Fig.1
Fig.2
Fig.4
WITNESS:
Esther M. Stockton
INVENTOR.
Edwin Elliott Hood
BY
Clinton S. Janes
ATTORNEY

United States Patent Office 2,989,879
Patented June 27, 1961

2,989,879
ACTUATOR FOR TWO-SPEED BICYCLE GEARING
Edwin Elliott Hood, Elmira, N.Y., assignor to The Bendix Corporation, a corporation of Delaware
Filed Nov. 19, 1958, Ser. No. 774,887
4 Claims. (Cl. 74—781)

The present invention relates to an actuator for two-speed bicycle gearing, and more particularly to means for shifting the sun gear of planetary reduction gearing in a bicycle hub.

The present invention is an improvement over the gear shifting device shown in applicant's prior Patent 2,609,712 issued September 9, 1952.

It is an object of the present invention to provide a novel gear shifting device which is efficient in operation, economical in construction and particularly simple and easy to assemble and adjust.

It is another object to provide such a device embodying a manually operated cable shifting device which is so constructed that the cable may be reoriented with respect to the bicycle hub without disturbing the linear adjustment of the cable.

Further objects and advantages will be apparent from the following description taken in connection with the accompanying drawing in which:

FIG. 1 is a side elevation, partly broken away and in section, of a portion of the rear axle assembly of a two-speed bicycle hub incorporating applicant's novel gear shifting mechanism;

FIG. 2 is a section taken substantially on the plane of line 2—2 of FIG. 1;

FIG. 3 is a top view of the shifting lever and mounting mechanism shown in FIG. 1; and FIG. 4 is a detail in perspective of one of the plate members forming the mounting frame for the shifting lever.

In FIG. 1 of the drawing there is illustrated an axle 1 having a pinion 2 slidably mounted thereon for movement into and out of engagement with a clutch and bearing member 3 which is threaded on the axle 1 and adapted to be locked in the frame of the vehicle by means of a washer 4 and clamp nut 5 in the usual manner.

A planet carrier 6 is rotatably mounted on the axle 1 and formed with internal clutch teeth 7 engageable by the pinion 2. It will be understood that the gearing in the present disclosure is the same as in applicant's prior patent cited, where in the transmission is in low gear when the pinion 2 engages the clutch member 3 as illustrated, and the transmission is in high gear when the pinion engages the planet carrier 6.

The axle 1 is formed with a central bore 8 extending from the outer end of the axle inwardly beyond the pinion 2, and with radial slots 9 and 11 intersecting said bore. A pair of U-shaped yoke members 12, 13 are slidably mounted in said slots and provided with radial terminal portions or flanges 14, 15 bearing loosely on opposite sides of the pinion 2 when the bottoms of the yoke members are in engagement as shown. The slots 9 and 11 are preferably formed by a rotary milling cutter which leaves shoulders 16, 17 and 18, 19 forming abutments limiting the travel of the yoke members 12, 13.

Means in the form of a compression spring 21 in the bore 8 of the axle 1 normally holds the yoke with the member 12 thereof in engagement with shoulders 17, 19, thus defining the low gear position of the pinion 2. Manually operable means for shifting the pinion into high gear position is provided comprising a rod 22 slidably mounted in the bore 8 of the axle and projecting therefrom as shown at 23. A bell crank lever 24 is pivotally mounted at 25 in a skeleton frame indicated generally by the numeral 26 which is mounted on the end of the axle 1 in position to cause one arm 27 of the bell crank lever to bear against the outer end 23 of the thrust rod 22. The other arm 28 of the bell crank lever has a cable connecting member 29 pivoted thereto at 31. It will be understood that the cable for actuating said lever will be mounted on the frame of the bicycle in the usual manner and is connected to a manual retracting means placed conveniently for the operator.

The mounting frame 26 for the bell crank lever 24 comprises a pair of plate members 32, 33 which are held in spaced parallel relation by a rivet 34 and by the pivot pin 25, suitable spacing means 35 being provided to permit the lever to swing freely between said plates. The plate members 32, and 33 are formed with offset portions 36, 37 having stepped apertures 38 punched therein (FIG. 4) leaving boundary strips or bars 39 which are bent in arcuate form. A nut 41 threaded on the axle 1 is grooved as indicated at 42 to slidably receive the bars 39 and thereby provide a swivel connection between the nut and the frame 26. The margins 43 of the openings 38 opposite the bars 39 are flat and form abutment surfaces for the end of the axle 1 when said frame is clamped on the axle by tightening the nut 41.

The hub is assembled in the rear fork of a bicycle in the usual manner and clamped in position by tightening up the nut 5. The frame 26 is then drawn up against the end of the axle by the nut 41, and the actuating cable adjusted to ensure the proper travel of the pinion 2 on the axle 1.

In view of the swivel connection of the frame 26 on the nut 41 the frame may be swung on the axle 1 to properly orient it with respect to the cable actuating means by merely loosening the nut 41 and rotating said frame. Since the frame is not threaded on the axle, this pivotal movement of the frame does not disturb the adjustment of the cable actuating means. It is thus possible to remove and replace the cable actuating assembly including frame 26 without disturbing its adjustment as determined by the abutment of the surfaces 43 of the frame against the end of the axle 1 when the nut 41 is tightened up.

Although but one embodiment of the invention has been shown and described in detail, it will be understood that changes may be made in the design and arrangement of the parts without departing from the spirit of the invention.

I claim:
1. In a gear shifting device for variable speed gearing for velocipedes and the like, a fixed axle, a pinion slidably mounted thereon, said axle having a transverse slot, yoke members slidably mounted in said slot bearing on opposite sides of the pinion, said axle having an axial bore extending from the end of the axle inwardly beyond said transverse slot, a rod slidably mounted in said bore in thrust engagement with said yoke and projecting from the axle, a nut provided with a hub portion threaded on the end of the axle, a frame member swivelled on said nut hub portion, a bell crank lever pivoted in said frame with one arm in thrust engagement with the outer end of said rod, and its other arm having means for attaching a flexible cable thereto, said frame having an abutment surface clamped by said nut to the end of the axle to hold the frame in oriented position with respect to said cable independent of the rod and pinion positions.

2. A gear shifting device as set forth in claim 1 in which the lever-supporting frame comprises two plate members and means for holding the plate members in parallel spaced relation with the lever pivoted therebetween, said plate members having apertured offset portions arranged to embrace the nut hub portion, said nut hub portion having a terminal flange slidably received in the apertures to form said swivel connection.

3. A gear shifting device as set forth in claim 2 in which an edge portion of said plate members' apertured offset portions provide the flat abutment surface which bears on the end of the axle when the nut is screwed on the axle to clamp the frame in oriented position on the axle.

4. A gear shifting device as set forth in claim 1 in which yoke members are in the form of U-shaped members with their bottoms in contact and with flanges bearing loosely on opposite sides of the pinion, and including further a compression spring in the bore of the shaft, pressing the yoke members against said thrust rod.

References Cited in the file of this patent

UNITED STATES PATENTS

| | | |
|---|---|---|
| 803,250 | Smith | Oct. 9, 1906 |
| 863,422 | Newton | Aug. 13, 1907 |
| 2,149,901 | Ellett | Aug. 10, 1915 |
| 2,441,989 | Brown | May 25, 1948 |
| 2,609,712 | Hood | Sept. 9, 1952 |
| 2,731,857 | Marino | Jan. 24, 1956 |

FOREIGN PATENTS

| | | |
|---|---|---|
| 180,915 | Great Britain | June 8, 1922 |
| 745,104 | France | Feb. 7, 1933 |
| 822,350 | Germany | Nov. 26, 1951 |